US 7,913,185 B1

(12) United States Patent
Benson et al.

(10) Patent No.: US 7,913,185 B1
(45) Date of Patent: Mar. 22, 2011

(54) GRAPHICAL INSERTION OF JAVASCRIPT POP-UP MENUS

(75) Inventors: Douglas S. Benson, Plano, TX (US);
John B. Ahlquist, Sachse, TX (US);
Dennis Griffin, Mission Viejo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1107 days.

(21) Appl. No.: 10/001,213

(22) Filed: Oct. 25, 2001

(51) Int. Cl.
*G06F 3/048* (2006.01)

(52) U.S. Cl. .................... 715/808; 715/762; 715/810

(58) Field of Classification Search .................. 345/763, 345/808, 810, 811, 762, 513
See application file for complete search history.

(56) References Cited

U.S. PATENT DOCUMENTS

| | | | | |
|---|---|---|---|---|
| 5,500,936 A * | 3/1996 | Allen et al. | .................... | 345/808 |
| 5,652,714 A * | 7/1997 | Peterson et al. | .................. | 702/57 |
| 5,742,768 A * | 4/1998 | Gennaro et al. | ....................... | 1/1 |
| 5,805,167 A * | 9/1998 | van Cruyningen | ........... | 715/808 |
| 6,229,539 B1 * | 5/2001 | Morcos et al. | ................. | 715/808 |
| 6,230,174 B1 * | 5/2001 | Berger et al. | ................. | 715/513 |
| 6,262,734 B1 * | 7/2001 | Ishikawa | ........................ | 345/850 |
| 6,356,867 B1 | 3/2002 | Gabal et al. | | |
| 6,388,688 B1 * | 5/2002 | Schileru-Key | ................ | 715/854 |
| 6,476,834 B1 * | 11/2002 | Doval et al. | .................... | 715/863 |
| 6,538,673 B1 | 3/2003 | Maslov | | |
| 6,546,397 B1 * | 4/2003 | Rempell | ........................ | 707/102 |
| 6,620,204 B1 * | 9/2003 | Malcolm | ........................ | 715/513 |
| 6,668,354 B1 * | 12/2003 | Chen et al. | ..................... | 715/517 |
| 6,697,825 B1 * | 2/2004 | Underwood et al. | ......... | 715/207 |
| 6,762,777 B2 * | 7/2004 | Carroll | ........................... | 715/808 |
| 6,769,015 B1 * | 7/2004 | Bates et al. | .................... | 709/206 |
| 7,003,506 B1 * | 2/2006 | Fisk et al. | .......................... | 707/1 |
| 7,620,912 B1 | 11/2009 | Benson | | |
| 2001/0020952 A1 | 9/2001 | Iwasaki | | |

OTHER PUBLICATIONS

Fireworks® 4 Bible, Joseph Lowery and Simon White, Copyright 2001, Hungry Minds, Inc., pp. 684-688.*
"Working with Windows" Javascript tutorial. Copyright 2000 internet.com Corp. Produced by Yehuda Shiran and Tomer Shiran, http://web.archive.org/web/20000511211609/www.webreference.com/js/tutorial1/index.html.*
Steven Haines, Jul. 10, 2000, Article by Que, "Java Menus #1: Java Swing and Menus".*
Shiran et al. "Creating a Popup Window" Tutorial www.webreference.com/js/tutorial1/popup.html, Created Apr. 10, 2000.*
Lowery, Joseph et al., Working with Pop-Up Menus, Fireworks 4 Bible, 2001, pp. 684-688. Hungry Minds, Inc., New York, New York, USA.
Notice of Allowance dated Jul. 9, 2009 in U.S. Appl. No. 10/001,212.
Decision on Appeal dated Jun. 15, 2009 in U.S. Appl. No. 10/001,212.

(Continued)

*Primary Examiner* — Sara England
(74) *Attorney, Agent, or Firm* — Kilpatrick Townsend & Stockton LLP

(57) ABSTRACT

A graphical user interface allows a user to create an image having a pop-up menu which is exportable to a target computer without the creating user being required to know how to program in JAVASCRIPT™. Using menu selection in the application in which the image is running, the creating user may insert a pop-up menu instruction associated with an object and positioned at a desired location within the image. The inserted pop-up menu instruction then causes the creating computer to invoke its own routines that construct an exportable JAVASCRIPT™ file that allows for a pop-up menu associated with the desired object to be displayed on the screen of a target system.

19 Claims, 6 Drawing Sheets

OTHER PUBLICATIONS

Examiner's Answer dated Aug. 9, 2007 in U.S. Appl. No. 10/001,212.
Examiner's Answer dated Aug. 23, 2006 in U.S. Appl. No. 10/001/212.
Office Action dated Nov. 1, 2005 in U.S. Appl. No. 10/001,212.
Office Action dated Apr. 20, 2005 in U.S. Appl. No. 10/001,212.
Advisory Action dated Jan. 31, 2005 in U.S. Appl. No. 10/001,212.
Office Action dated Oct. 29, 2004 in U.S. Appl. No. 10/001,212.
Interview Summary dated Jun. 30, 2004 in U.S. Appl. No. 10/001,212.
Office Action dated May 5, 2004 in U.S. Appl. No. 10/001,212.

* cited by examiner

GRAPHICAL INSERTION OF JAVASCRIPT POP-UP MENUS

RELATED APPLICATION

The present application is related to co-pending and commonly assigned U.S. patent application Ser. No. 10/001,212, entitled "GRAPHICAL ASSIGNMENT OF OBJECT BEHAVIORS", concurrently filed herewith, the disclosure of which is hereby incorporated herein by reference.

BACKGROUND OF THE INVENTION

Pop-up menus have become common place in computer applications. A pop-up menu may be created in SUN MICROSYSTEMS INC.'s JAVASCRIPT™ and is executed by a web browser. Usually, these menus "pop-up" when the user's mouse or pointing device is positioned over a certain screen image or position. It is common to insert these pop-up menus in web pages and/or application servers at a central location, for example a host web server. Web users will then be able to access the web pages with the pop-up menus thereon by accessing the central location to download the web page or the transferable portions of an application server.

A web page or script which is to be downloaded from one site (host) to user's site (target) is typically downloaded, perhaps using the Internet, under control of the target user's Internet browser. In this situation it is desirable for the host site web page to be established using any combination of SUN MICROSYSTEMS INC.s JAVA™ code, JAVASCRIPT™, HTML, XML, and the like. JAVASCRIPT™ is a high level scripting language that uses a similar syntax as JAVA™, although it is not compiled into bytecode on the client. JAVASCRIPT™ is not as powerful as JAVA™, which is a full-blown programming language, but is much easier to use than JAVA™. However, JAVASCRIPT™ still requires familiarity by the user in order to adequately program or script web page material. Thus, the creator of the web page at the host site must have an understanding of JAVASCRIPT™ coding as well as graphics if he/she is to be able to create documents as the host site which, when downloaded to a target computer, will allow the user to roll his/her mouse over images or text in that document and have associated pop-up menus appear. These pop-up menus provide the user additional information, options, or links to additional information, optionally controlled by the target user. Even though JAVASCRIPT™ is easier to use than JAVA™, the document creator at the host site still needs to be fluent in JAVASCRIPT™ and HTML which means that technically trained people are required to setup these documents. This creates a bottleneck, delays implementation and is costly.

BRIEF SUMMARY OF THE INVENTION

The present invention is directed to a system and method that provides a graphical user interface to create web documents and files having imbedded therein pop-up menus without the creator of the document being required to understand JAVASCRIPT™ code, HTML, or the like. The system and method allows for the creation of pop-up menus which, when downloaded to a target computer, will cause all of the JAVASCRIPT™ or other code that is necessary for the assembly and/or control of pop-up menus to be established at the target site.

This invention can be used in web applications, such as FIREWORKS™ (available from MACROMEDIA, INC.) graphics application, to add pop-up menus in a graphical manner without requiring the developer to use JAVA™, JAVASCRIPT™, HTML, or the like. FIREWORKS™ (a trademark of MACROMEDIA, INC.), for example, contains web page constructs called hotspots and slices. A hotspot is an object that is a user-definable portion of an image which may be assigned a behavior or action that causes some other action to occur on a computer screen when a mouse or user pointer runs across or clicks the hotspot.

A slice is also an object, available in applications such as FIREWORKS™, that can be defined, selected, and moved during the creation of a web page, and which defines how an image will be split into multiple images upon being exported. The developer may attach or associate different JAVASCRIPT™ behaviors to a hotspot, slice or other such objects within a web site. The creator may select the object, hotspot, or slice, and choose INSERT POP-UP MENU. There are several possible and or alternative methods of choosing INSERT POP-UP MENU. Some of these methods may include: 1) using the INSERT MENU from the menu bar; 2) using the right mouse button; 3) using a graphical widget directly on the slice; and the like. All of these methods result in opening a SET POP-UP MENU dialog box or other similar interaction interface for the user. This dialog is similar to a wizard in that it provides a place to enter the menu text. Using the dialog, the user may preferably enter the desired text and appearance of the pop-up menu, as well as formatting any submenus and entering any text for the submenus. For example, if one was creating a web site for a car manufacturer, there might be a menu called cars and sub-menu items thereunder listing car types; and another menu item could be called trucks with sub-menus listing truck types or truck names. The SET POP-UP MENU dialog would also preferably include functionality that allows the user to graphically select an option to create such sub-menus.

For each of the pop-up menu items, or sub-menu items, the creator may preferably apply a link within the SET POP-UP MENU dialog, so that when the user selects that menu item, he/she will, for example, be directed to a particular web page. Also within the dialog, the creator would preferably be able to specify that the web page will be opened in the same browser window, in a new browser window, or in a targeted frame of a browser window.

The system operates such that the creator may establish the graphical appearance and function of the pop-up menu, which will later appear on the target user's screen under control of a JAVASCRIPT™ parser/interpreter. The appearance may be completely HTML-based with the background color and font size and style selected by the developer. The developer may also preferably use an image style in which the background of the menu item will be a graphic, such as a granite look, or similar image, or a background that looks like an actual button or any other desired graphic.

After creation of the menus with its background colors, graphics, and the like, the creator is shown a graphic proxy pop-up which, for example, may preferably be a blue or dotted lined rectangle that is linked to the newly created slice or hotspot. By dragging this proxy around the screen, the creator establishes the position or offset between the slice or hotspot and the screen position at which the pop-up menu will pop-up. Other methods of choosing the relative position of a pop-up menu may include designating the position via numerical coordinates or selecting between spatially descriptive words such as above, below, left, and right. These methods may also be used to indicate the relative positioning between a pop-up menu and a sub-menu.

Another approach to describing the present invention involves viewing the system from a creator perspective. One embodiment preferably provides autonomous generation of a script by allowing the developer to define a pop-up type relation between web objects, such as HTML or regular text, images, and/or standard objects such as hotspots and slices. Upon selecting to create a pop-up relation, a menu system prompts the developer for modification of attributes associated with the pop-up menu. A script generator is preferably used to autonomously generate a script source code representing the web page and its associated pop-up menu created by the developer.

In various embodiments, a creator may have the ability to select an upload menu option. This upload menu option allows the creator to create and upload to a server the HTML, images and JAVASCRIPT™ that may then be loaded to a web browser. Likewise, there may also be the option to save or preview the creation locally without uploading the creation to a specific server. Additionally, the system may allow the creator to preview the JAVASCRIPT™ and HTML source generated by the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
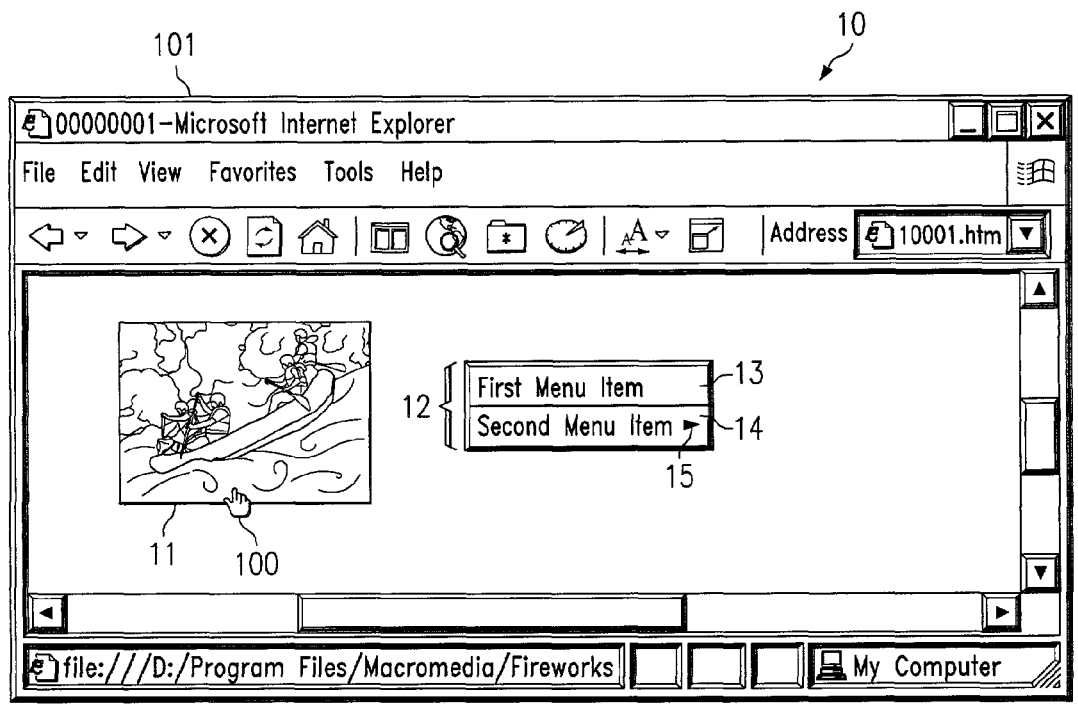
FIG. 1 shows a portion of a typical browser screen showing an image having an associated pop-up menu.

Turning now to FIG. 1, there is shown browser screen 10 and target computer screen 101. Image 11 is shown having pointer 100 positioned over a hotspot located on image 11. The positioning of pointer 100 over the hotspot causes pop-up menu 12 to appear. Pop-up menu 12 has first and second Items 13 and 14 with relevant menu text, such as second menu item 15. To operate pop-up menu 12, a user would position pointer 100 over the desired menu item to select the desired action. When the user selects the menu item, the functionality associated with that menu item will be executed. For example, upon selection of first menu item 13, a new web page may be loaded on to the user's computer.

Figure 2:
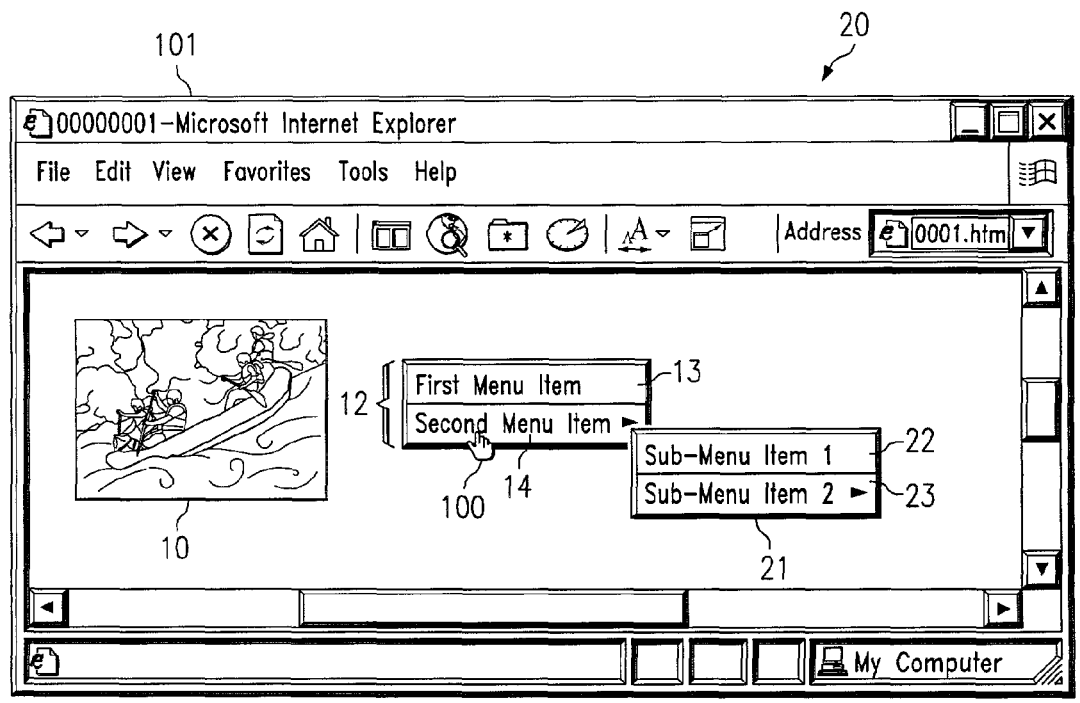
FIG. 2 shows a portion of a typical browser screen showing an image having an associated pop-up menu, the second menu item having two submenu items.

FIG. 2 shows pointer 100 rolling over menu item 14. This action causes sub pop-up menu 21 to appear, thus, providing two sub-menu items 22 and 23. In this function of providing sub-menus, as pointer 100 rolls over second menu item 14, the function associated with second menu item 14, executes the presentation of sub pop-up menu 21. The user may then preferably position pointer 100 over either of desired sub-menu item 22 or 23, select the desired item, which will then execute the behavior or functionality associated with the selected item.

Figure 3:
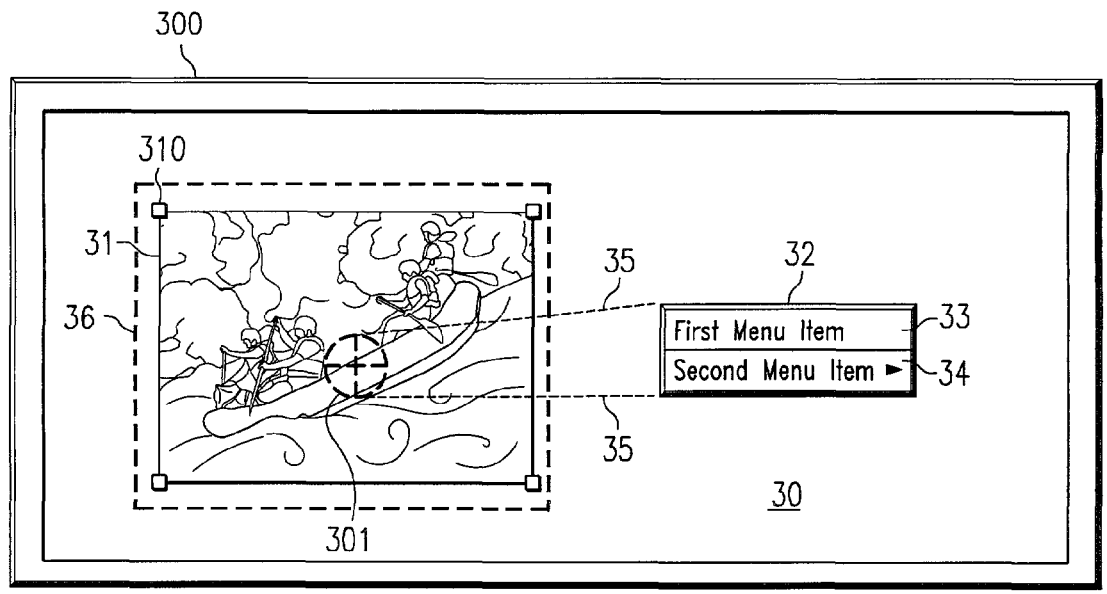
FIG. 3 shows a portion of a screen outlining the relationship between the various elements.

FIG. 3 illustrates a graphical development environment that may be used to implement a preferred embodiment of the present invention. A web developer or creator would preferably use such a graphical development environment to create and develop web pages and web sites. Screen 30 is used by the creator to establish pop-up menus, such as menu 32. Line 35 is used to show the relationship between menu 32 and hotspot 31 which is a portion of image 36. Object icon 301 is displayed in the center of selected hotspot or slice object 31. Clicking object icon 301 will display a list of behaviors (including Add Pop-Up Menu) that can be added to object 31. In this embodiment, hotspot object 31 may be exported in HTML as an image map. Handles 310 indicate that the hotspot is currently selected. When hotspots or slice objects are selected, any associated pop-up menus are shown to the developer using highlight feedback, which, by way of example only, may be dotted lines 35 connected to menu 32. It should be noted that highlight feed back may comprise a single dotted line between the menu and its associated object, or may comprise a blue line or other similar graphical link representation. The pointer tool may preferably be used to drag menu 32 to define exactly where the menu will be positioned in the browser, relative to its associated hotspot or slice. In addition to hotspot or images, a pop-up menu may be attached to a selected range of HTML text.

Figure 4:
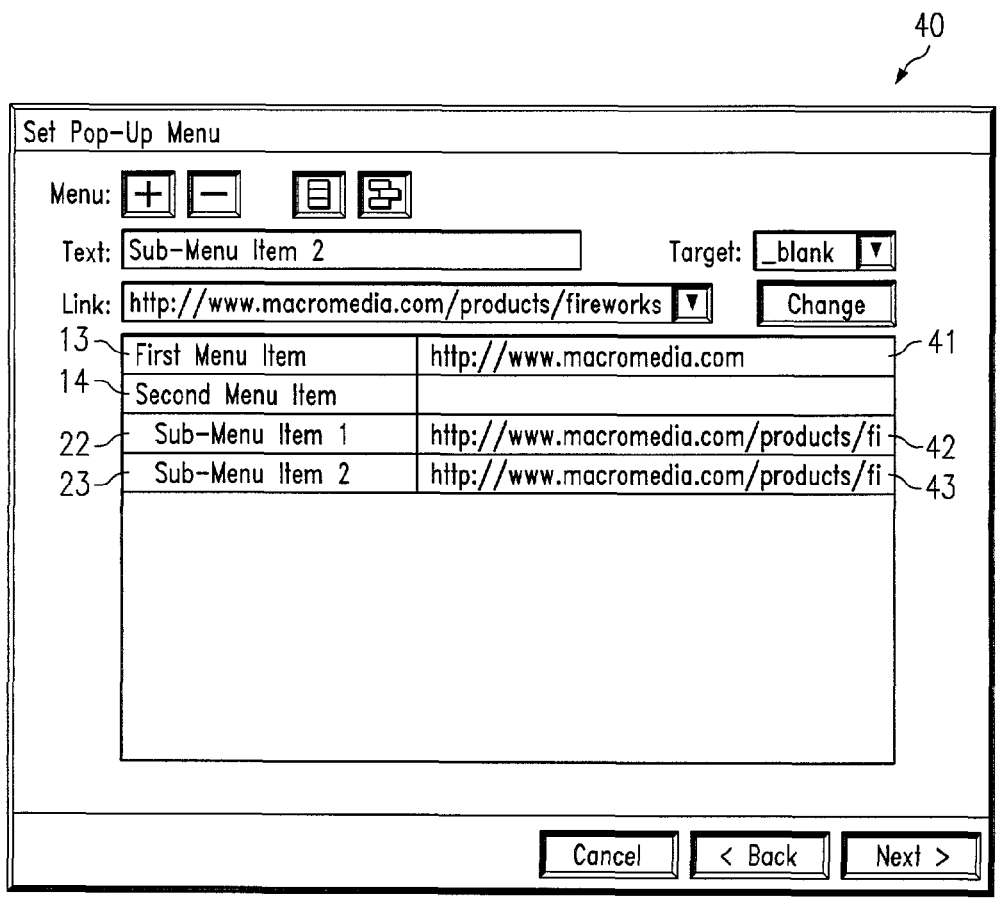
FIGS. 4 through 7 show various screens used by a creator to graphically establish pop-up menus with respect to various objects.

FIG. 4 illustrates SET POP-UP MENU dialog box 40 which is presented to a developer in order to graphically create a pop-up menu using a preferred embodiment of the present invention. Dialog boxes are a form subset of user interaction interfaces often used to present users of various applications with prompts concerning actions the user may have selected. With reference to pop-up menu 12 from FIG. 1, dialog box 40 preferably allows the creator to assign functions, behaviors, or web links, such as those illustrated links 41, 42, 43, to each of menu items 13 and 14 or sub-menu items 22 and 23. One of those assigned functions, which is illustrated in FIG. 4, is to assign a sub-menu function as shown by sub-menu items 22 and 23 assigned as a sub-menu of Second Menu Item 14.

Figure 5:
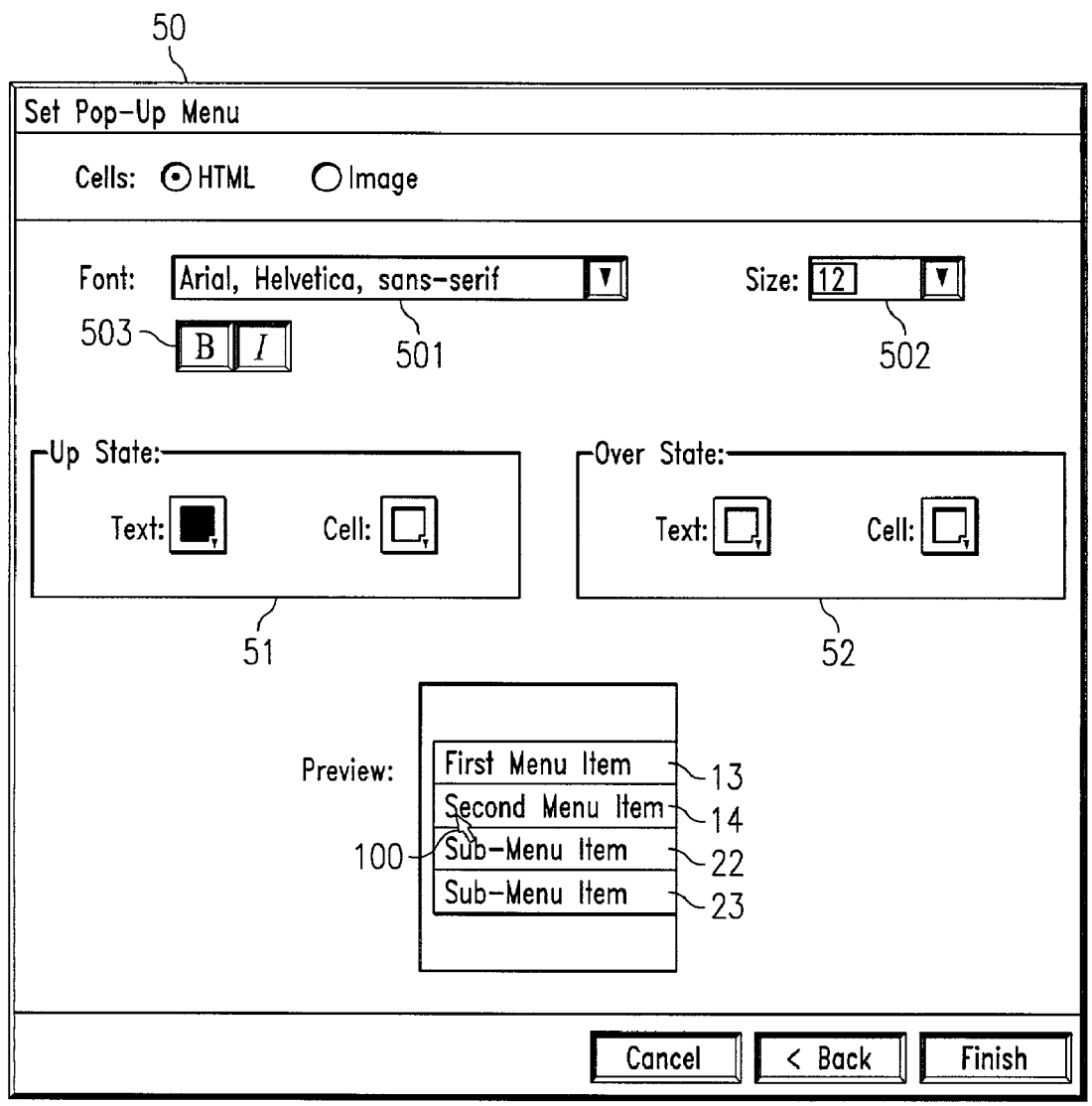

SET POP-UP MENU dialog box 40 may also preferably include format screen 50, shown in FIG. 5. Format screen 50 allows the creator to add various fonts 501, sizes 502, and script types 503 (bold, italics, underlining, etc.) to selected menu item 4. For each menu item the user may preferably select properties regarding Up State (51) or Over State (52) formats. Up State (51) format would control the appearance of the menu item when the pop-up menu is visible. Over State (52) format would control the appearance of the menu item when the user rolls over or selects the particular item.

Figure 6:
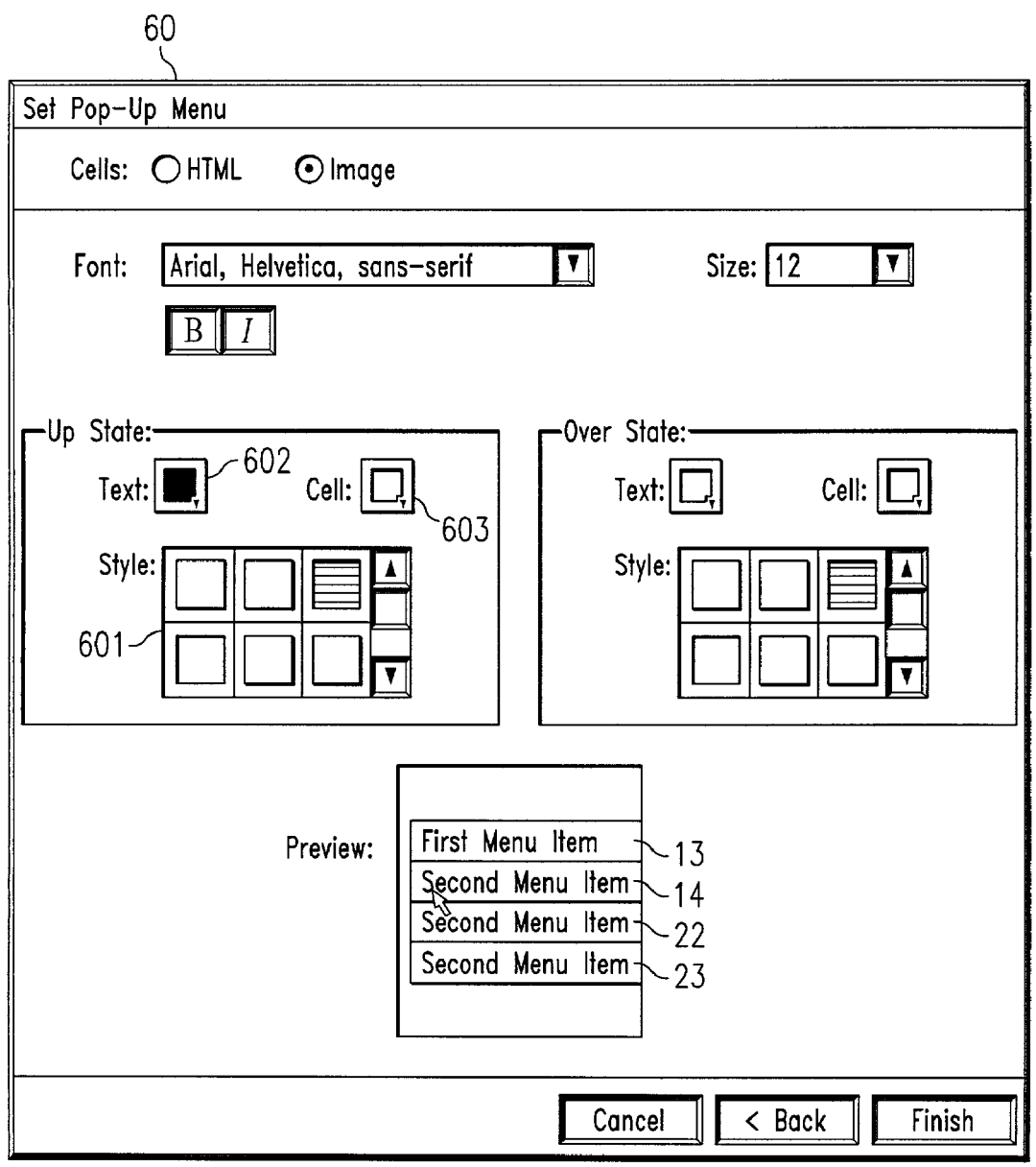

It should be noted that alternative embodiments of the present invention may allow for the addition of increased formatting in order to provide the developer with increased control over the appearance and function of the pop-up menu. FIG. 6 illustrates such an alternative embodiment of the present invention with alternative format screen 60. Format screen 60 shows how the creator can add other attributes, such as style 601, or color 602 and 603 to a selected menu. Any manner of attributes and/or JavaScript attributes may be used, including, border colors; border style (3D, shadowing, etc.); border width, orientation of the menu of the text graphics within a menu; background control (solid color or graphics); static or dynamic; JPEG or GIF; a user created graphic; distance between menu items or between a menu item and its sub-menus; timing until the menu disappears (menu delay).

It should also be noted that the pop-up menu may be associated with HTML or regular text, graphics, or with objects and other such web page items. For example, a pop-up menu may be associated with a certain selected portion of HTML text, or with a specific graphic image, a region of the web page, or with an object, such as a hotspot or slice.

It should also be noted that the pop-up menu may be defined using text or graphics. For example, a pop-up menu may pop up showing textual menu items. Alternatively, a pop-up menu may pop up a series of graphical images, which may comprise any number of different graphics such as icons, buttons, graphical representations of text, and other similar graphics.

Also, it should be noted that the positioning of pop-up menus with respect to their objects may be defined graphically (as discussed above with manual, graphical positioning) or using coordinates or textual definition (such as "offset by X pixels in the X direction and Y pixels in the Y direction").

Figure 7:
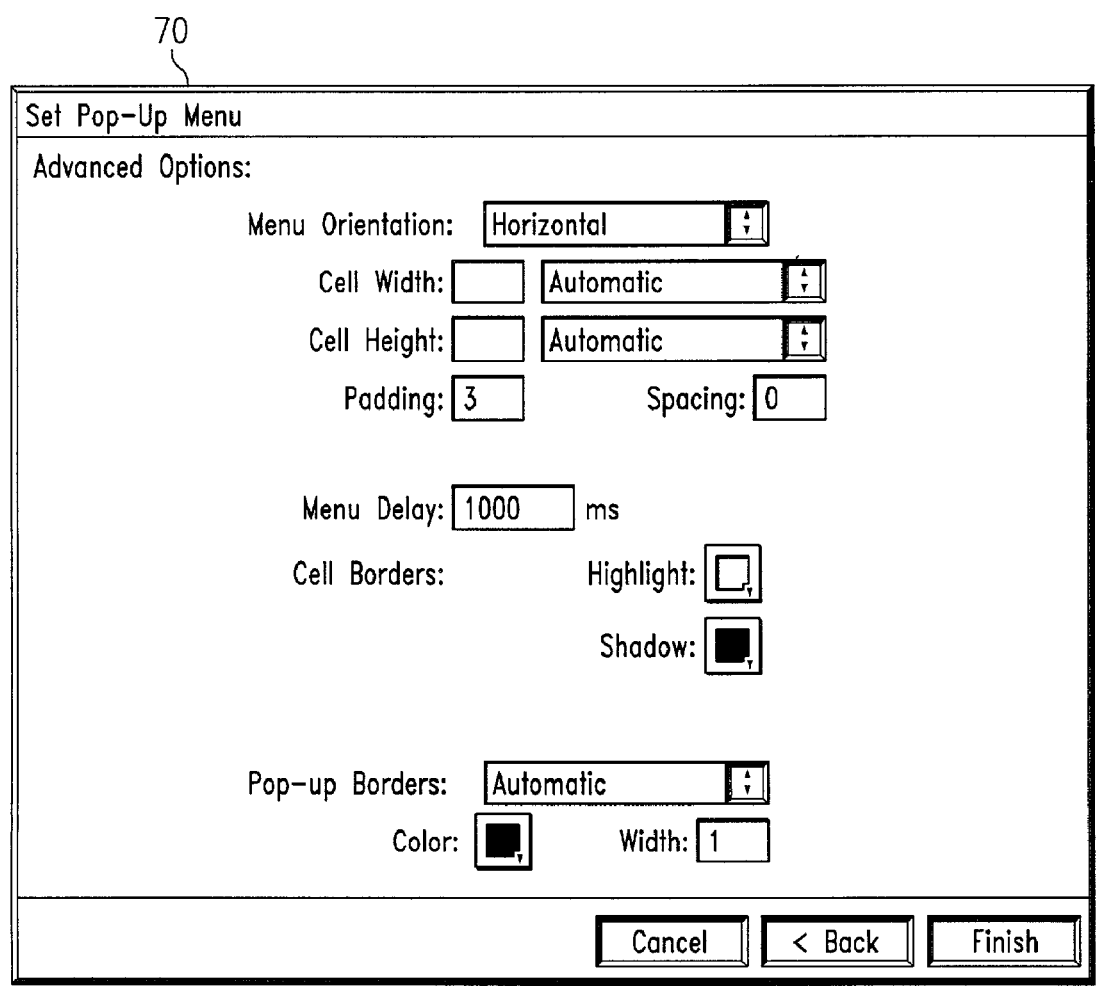

It should further be noted that alternative embodiments of the present invention may allow web developers to control and assign advanced options to the pop-up menus. FIG. 7 illustrates such a preferred embodiment of the present invention with advanced options screen 70. Advanced options screen 70 would preferably be one of the available screens offered on SET POP-UP MENU dialog box 40 (FIG. 4). By accessing advanced options screen 70, the web creator would preferably be capable of controlling the cell width and height for each menu item, the appearance of the cell borders, or the menu delay, which is the amount of time for the pop-up menu to stay visible after the user rolls off of the pop-up menu. Thus, the creator preferably has a much greater control over the development and creation of the pop-up menu without needing to be familiar with any coding or scripting languages.

In one embodiment, a template file stored in the configuration folder of the application defines common elements used by pop-up menus, including the control of the screens which allow for the creation of pop-up menus as depicted in FIGS. 1-7. In this implementation, the template file defines all control codes used to manipulate pop-up menus except for the graphical appearance which may later be added by the creator in the manner described above. The template file defines the basic code and or JAVASCRIPT™ necessary to implement any pop-up menu on multiple types of browsers. All of this control is generated as JAVASCRIPT™ inside the HTML document and is created autonomously by the system and method of the invention as the web file is exported from the development environment implementing the present invention to the host server. The JAVASCRIPT™ in the HTML document also references this external JAVASCRIPT™ file. When an image associated with a pop-up menu is exported to a target, a copy of the template file is also exported, thus providing the code used to generate the pop-up menu on the target site. All the HTML and JAVASCRIPT™ that describes the content and formatting of the particular instance of a pop-up menu is present in the HTML file that is exported when the popup menu is exported. As this template file is treated as a common element for creating a JAVASCRIPT™ pop-up menu, it is loaded only once. Such an external JAVASCRIPT™ template file enables a web site creator to create multiple pop-up menus on different pages while using only one instance of the template file. Code complexity, readability and size are thus positively affected, decreasing loading times and allowing for easier debugging of a web site.

Figure 8:
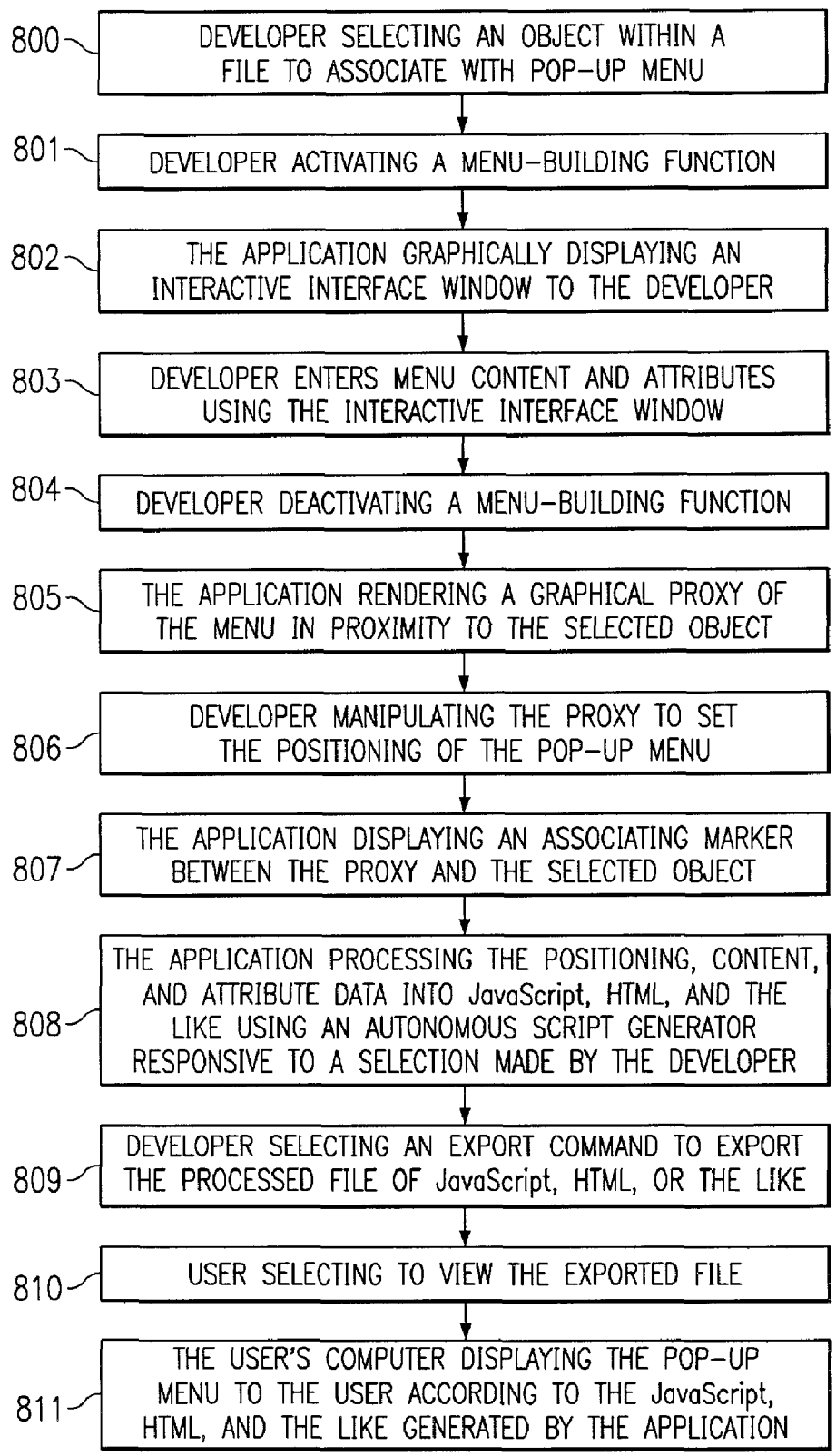
FIG. 8 is a flow chart showing the steps typically executed in implementing a preferred embodiment of the present invention.

FIG. 8 is a flow chart showing the steps typically executed in implementing a preferred embodiment of the present invention. In step 800, a developer selects an object within a file to associate with a pop-up menu. The developer then preferably activates a menu-building function in step 801. Upon activation, the application preferably graphically displays an interactive interface window to the developer in step 802. In step 803, the developer preferably enters menu content and attributes using the interactive interface window. Once finished entering this menu information, the developer deactivates the menu-building function in step 804. In step 805, the application then preferably renders a graphical proxy of the menu in proximity to the selected object. Step 806 entails the developer selecting the positioning of the menu by preferably manipulating the proxy to the desired positioning on the developer's screen.

During this editing process, the application preferably displays an associating marker between the proxy and the selected object in step 807. In step 808, the application then processes the positioning, content, and attribute data into JAVASCRIPT™, HTML, or the like using an autonomous script generator responsive to a selection made by the developer. The developer selects an export command to export the processed file of JAVASCRIPT™, HTML, or the like in step 809. A user desiring the view the file or access its contents would then select to view the exported file in step 810. The user's computer would then display the pop-up menu to the user in step 811 according to the JAVASCRIPT™, HTML, and the like generated by the application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
   receiving input to create a pop-up menu for a selected object in a web page under development in a web page development application, wherein the selected object and the pop-up menu are parts of the web page under development;

responsive to receiving said input, displaying a menu on a computer screen presenting a plurality of user-selectable options, wherein said plurality of user-selectable options allow format attributes for each item of the pop-up menu to be specified, wherein a preview area on the menu displays a preview comprising each item of the pop-up menu displayed according to the format attributes specified; and monitoring a user-controlled position of said pop-up menu, wherein said user-controlled position is independent of a position of said selected object and is preserved in a resulting web page.

2. The method of claim 1 wherein said plurality of user-selectable options further comprise:

one or more attributes, wherein said one or more attributes include menu delay of said pop-up menu associated with said selected object.

3. The method of claim 1 further comprising: detecting change in at least one position indicator responsive to said monitoring, wherein said change modifies said position between said selected object and said pop-up menu.

4. The method of claim 3 wherein said at least one position indicator comprises one of:

number coordinates; and spatial descriptive options.

5. The method of claim 1 further comprising:

creating a submenu associated with said pop-up menu responsive to receiving said input indicating user-selection of an associated one of said plurality of user-selectable options.

6. The method of claim 5 further comprising: establishing a second position between said submenu and said pop-up menu by monitoring changes to at least one additional position indicator.

7. The method of claim 6 wherein said at least one addition position indicator comprises one of:

number coordinates;

graphical proxy methods; and spatially descriptive options.

8. The method of claim 1 wherein said object comprises at least one of:

a hotspot;

a region of a web page;

an image; and text.

9. The method of claim 1 wherein said menu comprises one of:

a dialog box;

a pop-up panel; and a region of a computer screen having text to prompt for information.

10. The method of claim 1 wherein ones of said plurality of user-selectable options define one or more functions applicable to said pop-up menu, and wherein the method further comprises:

receiving one or more selection indicators from a pointing tool, wherein said one or more selection indicators select one or more of said plurality of user-selectable options;

responsive to receiving said one or more selection indicators, automatically associating code corresponding to related ones of said one or more functions to said pop-up menu.

11. The method of claim 1 wherein said plurality of user-selectable options allow format attributes for different states of each item of the pop-up menu to be specified.

12. The method of claim 1 wherein the preview area displays a preview of each item of a sub-menu of the pop-up menu according format attributes specified for each item of the sub-menu.

13. A computer implemented method comprising:

receiving input to create a pop-up menu for a selected object in a web page under development in a web page development application, wherein the selected object and the pop-up menu are parts of the web page under development, wherein the web page development application displays the selected object and the pop-up menu;

responsive to receiving said input, displaying a menu on a computer screen presenting a plurality of user-selectable options, wherein said plurality of user-selectable options allow format attributes for each item of the pop-up menu to be specified, wherein a preview area on the menu displays a preview comprising each item of the pop-up menu displayed according to the format attributes specified; and receiving input specifying a position of the pop-up menu displayed in the web page development application, the position of the pop-up menu relative to the selected object defining a positional relationship between the selected object and the pop-up menu, wherein when the web page is displayed, the web page displays the selected object and the pop-up menu, wherein pop-up menu is displayed in the web page based on the positional relationship between the selected object and the pop-up menu defined in the web page development application.

14. The method of claim 13 further comprising:

responsive to receiving said input, displaying a menu on a computer screen presenting a plurality of user-selectable options, wherein ones of said plurality of user-selectable options define one or more functions applicable to said pop-up menu;

receiving one or more selection indicators from a pointing tool, wherein said one or more selection indicators select one or more of said plurality of user-selectable options; and responsive to receiving said one or more selection indicators, automatically associating code corresponding to related ones of said one or more functions to said pop-up menu.

15. The method of claim 13 wherein the positional relationship is a relationship used to preserve where the pop-up is displayed relative to the selected object.

16. The method of claim 13 wherein the positional relationship defines whether the pop-up appears above, below, left, or right of the selected object.

17. The method of claim 13 wherein the input specifying the position of the pop-up menu is from a pointer tool dragging the pop-up menu displayed in the web page development application.

18. The method of claim 13 further comprising providing the web page by:

providing a first file that defines control codes used to implement pop-up menus on multiple types of browsers;

providing a second file as an HTML document defining at least some of the appearance of the web page that was under development, the second file comprising code referencing the first file; and exporting the first file and the second file.

19. The method of claim 13 wherein the web page development application displays an associating marker between the selected object and the pop-up menu.

* * * * *